Sept. 7, 1948.   B. H. CARROLL ET AL   2,448,858
OPTICALLY SUPERSENSITIZED PHOTOGRAPHIC
SILVER HALIDE EMULSION
Filed Nov. 23, 1945

Fig. 1.

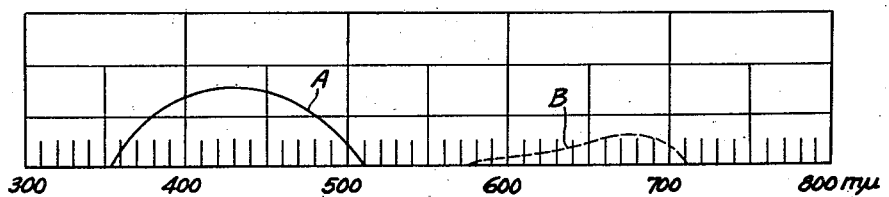

A = bis[1-phenyl-3-methyl-5-pyrazolone-(4)] pentamethine oxonol
or 3,3'-ethylenethiacyanine iodide B = bis[1-phenyl-3-methyl-5-pyrazolone-(4)] pentamethine
oxonol plus 3,3'-ethylenethiacyanine iodide

Fig. 2.

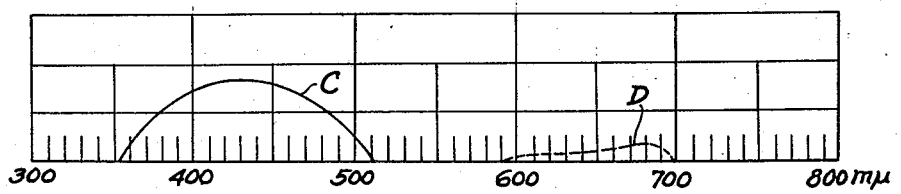

C = bis[1-phenyl-3-methyl-5-pyrazolone-(4)] pentamethine oxonol
or 3-[β-(1-piperidyl)vinyl]-β-naphthothiazole ethiodide D = bis[1-phenyl-3-methyl-5-pyrazolone-(4)] pentamethine oxonol
plus 2-[β-(1-piperidyl)vinyl]-β-naphthothiazole ethiodide Burt H. Carroll
Cyril J. Staud
INVENTORS

BY
ATTORNEYS

Patented Sept. 7, 1948

2,448,858

UNITED STATES PATENT OFFICE 2,448,858

OPTICALLY SUPERSENSITIZED PHOTOGRAPHIC SILVER HALIDE EMULSION

Burt H. Carroll and Cyril J. Staud, Rochester, N. Y., assignors to Eastman Kodak Company, Rochester, N. Y., a corporation of New Jersey Application November 23, 1945, Serial No. 630,544

19 Claims. (Cl. 95—7)

This invention relates to sensitized photographic emulsions and to a process for the preparation thereof.

It is known that photographic silver halide emulsions can be spectrally (optically) sensitized with certain dyes which adsorb directly on the silver halide. It is also known that acid and basic sensitizing dyes are relatively incompatible; for example, sensitization by means of combinations of eosin dyes and cyanine dyes is generally weaker than the sum of the individual effects produced by eosin dyes (acid) and the cyanine dyes (basic).

We have now found that certain dyes of the oxonol series many of which, in and of themselves, have only a weak sensitizing action (or even no appreciable sensitizing action) on photographic silver halide emulsions, and are only slightly adsorbed (or not appreciably adsorbed) on the silver halide, will sensitize, or show greatly improved sensitization of, photographic silver halide emulsions in the presence of one or more monomethine cyanine dyes (or salts), trimethine cyanine dyes (or salts), dimethine hemicyanine dyes (or salts) or styryl dyes (or salts).

The spectral sensitivity conferred on emulsions by the oxonol dyes, in accordance with our invention, disappears completely during development of the emulsions in ordinary developers containing a sulfite, such as sodium sulfite, although moderately strong values of red and green sensitivity can be obtained during exposure. This loss of optical sensitivity during development is unlike the situation which obtains when a sensitizing dye is adsorbed directly on the silver halide, as is the case in emulsions spectrally sensitized with cyanine dyes alone. Because the spectral sensitivity conferred upon the emulsions, by the oxonol dyes, in accordance with our invention, is lost during development, the invention is particularly useful in connection with certain color photographic selective reversal processes. For example, in a multi-layer color photographic element, where the layers are selectively developed, it is sometimes desirable to introduce a small amount of red sensitivity into the blue sensitive layer, in order to correct for the excessive yellow which is introduced into pale reds, such as flesh tints, as a result of interlayer effects, when the color process is balanced for a good neutral scale. If the red sensitization introduced into the blue sensitive layer persists through the first development of the selective reversal process, cyan is introduced into all yellows, with less satisfactory results than is the case when the excessive yellow is not corrected. Our invention provides a means of arriving at the desired red sensitivity which is then removed during the first development.

Our invention is also very useful for the sensitization of photographic silver halide emulsions which are used under circumstances where staining caused by residual sensitizing dye is undesirable, as in the case of emulsions used to prepare photographic printing paper or to prepare film for photomechanical reproduction. Since the acid oxonol dyes which we use in practicing our invention are removed during development, the dyes do not stain the developed element.

It is, accordingly, an object of our invention to provide novel, sensitized photographic emulsions and to provide a process for the preparation thereof. Other objects will become apparent hereinafter.

In accordance with our invention, we incorporate in a photographic silver halide emulsion at least one pentamethine oxonol dye selected from those represented by the following general formula:

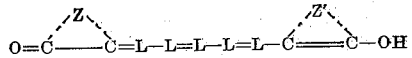

wherein L represents a methine group substituted or unsubstituted and Z and Z' each represents the non-metallic atoms necessary to complete a heterocyclic nucleus containing from 5 to 6 atoms in the heterocyclic ring or the metal or ammonium (substituted or unsubstituted) salt forms of these dyes and also incorporate in said emulsion as a supersensitizer for the said pentamethine oxonol dye, at least one basic dye selected from the group consisting of monomethine cyanine dyes, trimethine cyanine dyes, dimethine hemicyanine dyes and styryl dyes. The pentamethine oxonol dyes, wherein Z or Z' represents the non-metallic atoms necessary to complete a 5-pyrazolone nucleus containing a carboxyl group and/or a sulfo group, e. g., a 3-carboxy-5-pyrazolone nucleus, a 1-sulfophenyl-3-carboxy-5-pyrazolone nucleus, a 1-sulfophenyl-3-methyl-5-pyrazolone nucleus, a 1-(2,5-dichloro-4-sulfophenyl)-3- methyl-5-pyrazolone nucleus, etc., are advantageously employed in practicing our invention. However, the heterocyclic nuclei involved can as well be a rhodanine, a 2-thio-2,4(3,5)-oxazoledione, a barbituric acid, a thio-barbituric acid, etc. which may or may not contain carboxy and/or sulfo group or the ammonium or metal salt forms of such groups.

We are aware of the fact that symmetrical oxonol dyes of the above formula have been employed as filter dyes. However, we do not employ the dyes in concentrations great enough to produce any practical filter action. As pointed out in British Patent 506,385, dated May 24, 1939, when the oxonol dyes are used as filter dyes, they are employed in such an amount that, with respect to colored light for which the dye has its predominant absorption, the optical density of the material is greater than one. Contrasted with this, we employ the oxonol dyes in practicing our invention, in a concentration of not more than 0.25 gram per gram-mole of silver halide in the emulsion. Usually we employ the oxonol dye in a concentration of from about 0.025 to about 0.15 gram of dye per gram-mole of silver halide in the emulsion.

The quantity of basic dye employed may be several times greater than the concentration of the oxonol dye. Generally speaking, the most useful concentration of the basic dye is from 2 to 3 times the concentration of the oxonol dye, although higher or lower concentrations can be used, e. g., equal concentrations. The most effective concentration of the basic dye will be apparent in any given instance upon making the usual tests and observations customarily employed in the art.

As pointed out above, the basic dye may, in and of itself, have a sensitizing action upon the photographic emulsion, but this is not necessary.

Among the monomethine cyanine, trimethine cyanine, dimethine hemicyanine and styryl dyes which are most useful in practicing our invention are those which confer, in and of themselves no appreciable red sensitivity on photographic silver halide emusions. Such dyes act to supersensitize the pentamethine oxonol dyes, thereby conferring, in addition, red sensitivity on the emulsions.

Among the dyes especially useful in practicing our invention are the following:

(A) 1,1'-dialkyl-2,2'-cyanine salts, e. g.
    1,1'-diethyl-2,2'-cyanine iodide
    1,1'-dimethyl-2,2'-cyanine iodide
(B) 3,1'-dialkylthia-2'-cyanine salts, e. g.
    3-methyl-1'-ethylthia-2'-cyanine iodide
    3,1'-diethyl-6'-methylthia-2'-cyanine iodide
    3,1'-diethyl-6'-methoxythia-2'-cyanine iodide
(C) 3,1'-dialkyl-4,5-benzothia-2'-cyanine salts, e. g.
    3,1'-diethyl-4,5-benzothia-2'-cyanine bromide
    3,1'-diethyl-6'-methyl-4,5-benzothia-2'-cyanine bromide
(D) 3,1'-dialkyl-6,7-benzothia-2'-cyanine salts, e. g.
    3,1'-diethyl-6,7-benzothia-2'-cyanine bromide
(E) 3,1'-dialkylselena-2'-cyanine salts, e. g.
    3,1'-diethylselena-2'-cyanine iodide
(F) 3,3',9-trialkyloxacarbocyanine salts, e. g.
    3,3',9-triethyloxacarbocyanine iodide
(G) 3,3',9-trialkyloxathiacarbocyanine salts, e. g.
    3,3'-diethyl-9-methyloxathiacarbocyanine bromide
    3,3',9-triethyloxathiacarbocyanine bromide
(H) 3,3',9-trialkyloxaselenacarbocyanine salts, e. g.
    3,3'-diethyl-9-methyloxaselenacarbocyanine bromide
(I) 3,3',9-trialkyl-4',5'-benzoxathiacarbocyanine salts, e. g.
    3,3' - diethyl - 9 - methyl - 4', 5'- benzoxathiacarbocyanine bromide

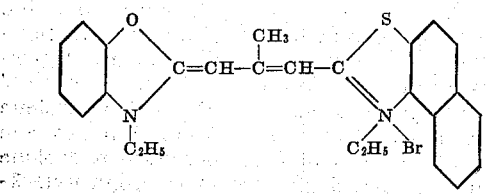

(J) 3,3',9-trialkyl-6,7-benzoxathiacarbocyanine salts, e. g.
    3,3'-diethyl-9-methyl-6,7-benzoxathiacarbocyanine bromide

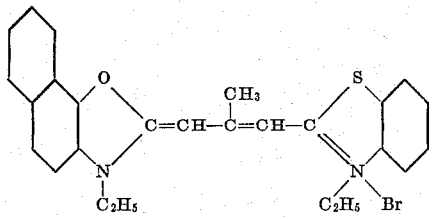

(K) 3,3',9-trialkyl-6,7,6',7'-dibenzoxacarbocyanine salts, e. g.
    3,3',9-triethyl-6,7,6',7'-dibenzoxacarbocyanine iodide
    3,3'-diethyl-9-methyl-6,7,6',7'-dibenzoxacarbocyanine iodide
(L) 1,1'-dialkyl-2,4'-cyanine salts, e. g.
    1,1'-diethyl-6,6'-dimethyl-2,4'-cyanine iodide
(M) 3,3'-ethylenethiacyanine salts, e. g.
    3,3'-ethylenethiacyanine iodide
(N) 3,3'-ethyleneoxacyanine salts, e. g.
    3,3'-ethyleneoxacyanine iodide
(O) 3,3'-dialkyloxacarbocyanine salts, e. g.
    3,3'-diethyloxacarbocyanine iodide
(P) 2-[β-(1-piperidyl)vinyl]-benzothiazole alkyl quaternary salts, e. g.
    2-[β-(1-piperidyl)vinyl]-benzothiazole methochloride
(Q) 2-[β-(1-piperidyl)vinyl]-β-naphthothiazole alkyl quaternary salts, e. g.
    2-[β-(1-piperidyl)vinyl]-β-naphthothiazole ethiodide
(R) 2-[β-(1-piperidyl)vinyl]-benzoselenazole alkyl quaternary salts, e. g.
    2-[β-(1-piperidyl)vinyl]-benzoselenazole ethiodide
(S) 2-[β-(1-morpholyl)vinyl]-benzothiazole alkyl quaternary salts, e. g.
    2-[β-(1-morpholyl)vinyl]-benzothiazole ethiodide
(T) 2-[β-(1-morpholyl)vinyl]-β-naphthothiazole alkyl quaternary salts, e. g.
    2-[β-(1-morpholyl)vinyl]-β-naphthothiazole ethiodide
(U) 2-[β(1-morpholyl)vinyl]-benzoselenazole alkyl quaternary salts, e. g.
    2-[β-(1-morpholyl)vinyl]-benzoselenazole ethiodide
(V) 2-(p-dialkylaminostyryl)pyridine alkyl quaternary salts, e. g.
    2-(p-dimethylaminostyryl)pyridine ethiodide
(W) 2-(p-dialkylaminostyryl)benzothiazole alkyl quaternary salts, e. g.
    2-(p-dimethylaminostyryl)benzothiazole ethiodide
(X) 2-(p-dialkylaminostyryl)-β-naphthothiazole alkyl quaternary salts, e. g.
    2-(p-dimethylaminostyryl)-β-naphthothiazole ethiodide
(Y) 2-(p-dialkylaminostyryl)benzoselenazole alkyl quaternary salts, e. g.
    2-(p-dimethylaminostyryl)benzoselenazole ethiodide
(Z) 2-(p-dialkylaminostyryl)quinoline alkyl quaternary salts, e. g.
    2-(p-dimethylaminostyryl)quinoline ethiodide
(A₁) 3,3'-dialkyl-9-[(3-alkyl-2(3)-benzoxazolylidene)methyl]-oxacarbocyanine salts, e. g.
    3,3'-diethyl-9-[(3-ethyl-2(3)-benzoxazolylidine)methyl]-oxacarbocyanine iodide
(B₁) 3,3'-dialkyl-9-alkyl-4,5-benzoxathiacarbocyanine salts, e. g.
    3'-ethyl-3,9-dimethyl-4,5-benzoxathiacarbocyanine iodide

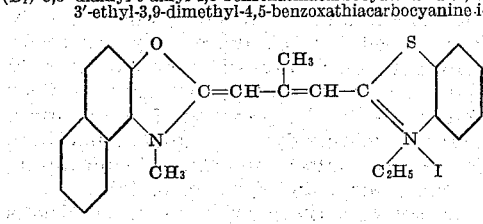

In all of the above groups of basic dyes those in which the alkyl groups contain from 1 to 4 carbon atoms are advantageously employed and those in which the alkyl groups are of the formula $C_dH_{2d+1}$ wherein $d$ represents a positive integer of from 1 to 2 are ordinarily most useful. The anion in the above basic dyes can be any anion, e. g. chloride, bromide, iodide, p-toluenesulfonate, methylsulfate, ethylsulfate, perchlorate, sulfamate, etc.

The order of addition of the oxonol dye and the basic dye to the emulsion appears to be of no importance and either one or the other may be added first or the substances may be added to the emulsion together. One or more of the oxonol dyes can be employed and one or more of the basic dyes can be employed.

The following examples will serve to illustrate further the manner of practicing our invention.

*Example 1*

Bis[1-p-sulfophenyl-3-methyl-5-pyrazolone-(4)]-pentamethine oxonol, in concentrations of 0.043 to 0.21 g. per mole of silver halide, caused barely detectable red sensitization in a fast negative type of gelatino-silver-bromiodide emulsion. Moderately good red sensitization with maximum at about 680 mu was produced by the aforesaid oxonol dye, in a concentration of 0.043 g. per mole of silver halide, in the aforesaid emulsion in the presence of the following basic dyes:

| Basic Dye | Concentration |
|---|---|
| 3-methyl-1'-ethylthiacyanine iodide | 0.043 |
| 3,3'-diethyloxacarbocyanine iodide | 0.085 |
| 3,3'-diethylenethiacyanine iodide | 0.085 |
| 2-[β-(1-piperidyl)vinyl]-benzothiazole methochloride | 0.21 |

None of the above basic dyes are capable of producing red sensitivity, in and of themselves.

Upon development, with or without exposure to white light, for 4 minutes in Eastman Kodak Company's "D-19" developer, the red sensitivity produced according to any of the foregoing embodiments disappeared practically completely, the developed emulsion being no more sensitive to red light than was the original emulsion which did not contain the oxonol dye or the basic dyes.

*Example 2*

Bis[1-phenyl-3-methyl-5-pyrazolone-(4)]-pentamethine oxonol, in concentration of 0.087 g. per mole of silver halide, caused very weak red sensitization in a fast negative type of gelatino-silver-halide emulsion with a maximum at about 670 mu. Much stronger red sensitization was produced in the same region by the aforesaid oxonol dye in the aforesaid concentration in the aforesaid emulsion, in the presence of the following basic dyes:

| Basic Dye | Concentration, g. per mole of silver halide | Red Speed Increase |
|---|---|---|
| N,N'-ethylenethiacyanine iodide (3,3'-ethylenethiacyanine iodide). | 0.087 | 25 fold. |
| 2-[β-(1-piperidyl)vinyl]-β-naphthothiazole ethiodide. | 0.087 | 10 fold. |
| 1-(1-benzothiazolyl)-4-[3-ethyl-1(2)-benzoxazolylidene)ethylidene]-3-methyl-5-pyrazolone. | 0.087 | 10 fold. |

None of the above basic dyes is capable of producing red sensitivity in and of itself.

*Example 3*

Bis[1,3-diethylbarbituric acid-(5)]-pentamethine oxonol, in a concentration of 0.085 g. per mole of silver halide, caused very weak red sensitization in a process gelatino-silver-bromiodide emulsion. Much stronger red sensitization was produced in the same region by the aforesaid oxonol dye in the aforesaid concentration in the same emulsion, in the presence of 3,3'-ethylenethiacyanine iodide (0.085 g. per mole of silver halide).

Similarly bis[3-carboxy-5-pyrazolone-(4)-pentamethine]-oxonol and bis[3-methyl-5-pyrazolone-(4)]-pentamethine oxonol, neither of which gives any measurable red sensitivity in gelatino-silver-halide emulsions alone, each gave some red sensitivity, in the presence of N,N'-ethylenecyanine iodide or chloride.

In a manner similar to that illustrated in the foregoing examples photographic silver halide emulsion can be sensitized with other supersensitizing combinations of pentamethine oxonol dyes and basic dyes.

The accompanying drawing illustrates graphically the supersensitizing effect obtained with two of our new combinations in a gelatino-silver-bromoiodide emulsion. Each figure in the drawing is a diagrammatic reproduction of three spectrograms. In Fig. 1, curve A represents the sensitivity of a gelatino-silver-bromoiodide emulsion containing bis[1-phenyl-3-methyl-5-pyrazolone-(4)]-pentamethine oxonol in a concentration of 0.087 g. per mole of silver halide in the emulsion. The same curve also represents the sensitivity of the same emulsion containing 3,3'-ethylenethiacyanine iodide in a concentration of 0.087 g. per mole of silver halide in the emulsion. Actually the curve represents the spectral sensitivity of the emulsion without either of the above compounds, since at the concentrations indicated, neither compound, alone, confers any appreciable extra spectral sensitivity on the emulsion. Curve B represents the sensitivity of the same emulsion containing both of the aforesaid dyes in the concentrations set forth above. The emulsion now possesses substantial red sensitivity along with its inherent blue sensitivity, whereas before, it possessed no appreciable red sensitivity.

In Fig. 2, curve C represents the sensitivity of a gelatino-silver-bromiodide emulsion containing bis[1-phenyl-3-methyl-5-pyrazolone-(4)]-pentamethine oxonol in a concentration of 0.87 g. per mole of silver halide in the emulsion. The same curve also represents the sensitivity of the same emulsion containing 2-[β-(1-piperidyl)vinyl]-β-naphthothiazole ethiodide in a concentration of 0.87 g. per mole of silver halide in the emulsion. Actually the curve represents the spectral sensitivity of the emulsion without either of the aforesaid dyes, since at the concentrations indicated, neither dye, alone, confers any appreciable extra sensitivity on the emulsion. Curve D represents the sensitivity of the same emulsion containing both of the aforesaid dyes in the concentrations set forth above. The emulsion now possesses substantial red sensitivity along with its inherent blue sensitivity, whereas before, it possessed no appreciable red sensitivity.

The pentamethine oxonol dyes can be incorporated in the emulsions directly or in the form of a solution in a suitable solvent, e. g. methyl alcohol, ethyl alcohol or acetone. The oxonol dyes including those containing a carboxyl and/or sulfo group, can also be employed in the form of their metal or ammonium salts. The salts are advantageously formed by adding to the oxonol dye, wet with a little water, methanol or ethanol, an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc., and taking up the salt which forms in a suitable solvent, e. g. water, methanol, ethanol, a mixture of water and methanol or a mixture of water and ethanol.

The basic dyes can be added to the emulsions directly or in the form of a solution in a suitable solvent, e. g. methanol, or ethanol.

The pentamethine oxonol dyes and the basic dyes are advantageously added to the washed, finished emulsions and should be uniformly distributed throughout the emulsions.

Our invention is directed primarily to the customarily employed gelatino-silver-halide developing-out emulsions, such as gelatino-silver-chloride, gelatino-silver-chlorobromide, gelatino-silver-iodochloride, gelatino-silver-chlorobromiodide, gelatino-silver-bromide and gelatino-silver-bromiodide emulsions.

Cyanine dyes, hemicyanine dyes and styryl dyes are defined in The Theory of the Photographic Process, C. E. Kenneth Mees, The MacMillan Company, New York, 1942.

Emulsions prepared in accordance with our invention can be coated in the usual manner on any suitable support, such as glass, cellulose acetate film, cellulose nitrate film, polyvinyl acetal resin film, paper or a suitable metal support.

3,3'-ethylenethiacyanine salts and 3,3'-ethylene-oxacyanine salts are described in the copending application of Leslie G. S. Brooker and Robert H. Sprague, Serial No. 563,086, filed November 11, 1944, as are other N,N'-ethylenecyanine salts.

Pentamethine oxonol dyes can be prepared by condensing glutaconic aldehyde dianilide hydrochloride with one or more ketomethylene compounds selected from those represented by the following general formula:

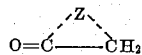

wherein Z represents the non-metallic atoms necessary to complete a heterocyclic nucleus containing from 5 to 6 atoms in the heterocyclic ring, e. g. 3-methyl-1-phenyl-5-pyrazolone, 3-methyl-1-sulfophenyl-5-pyrazolone, thiobarbituric acid, barbituric acid, etc. Two moles of the ketomethylene compound per mole of the glutaconic aldehyde dianilide hydrochloride are advantageously employed. The condensations are advantageously effected either in pyridine or in an ethyl alcoholic solution of a strong base such as triethylamine. The condensations can be accelerated by heating on a water or steam bath.

What we claim as our invention and desire to be secured by Letters Patent of the United States is:

1. A photographic silver halide emulsion sensitized with a supersensitizing combination of at least one oxonol dye selected from the group consisting of those represented by the following general formula:

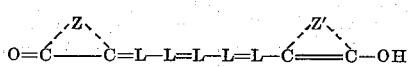

wherein L represents a methine group and Z and Z' each represents the non-metallic atoms necessary to complete a heterocyclic nucleus containing from 5 to 6 atoms in the heterocyclic ring, and the metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

2. A photographic silver halide developing-out emulsion sensitized with a supersensitizing combination of at least one oxonol dye selected from the group consisting of those represented by the following general formula:

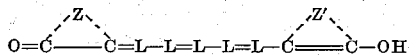

wherein L represents a methine group and Z and Z' each represents the non-metallic atoms necessary to complete a heterocyclic nucleus containing from 5 to 6 atoms in the heterocyclic ring, and the alkali metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

3. A photographic gelatino-silver-halide developing-out emulsion sensitized with a supersensitizing combination of at least one oxonol dye selected from the group represented by the following general formula:

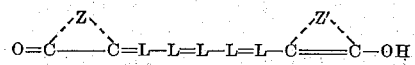

wherein L represents a methine group and Z and Z' each represents the non-metallic atoms necessary to complete a heterocyclic nucleus containing from 5 to 6 atoms in the heterocyclic ring and the metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

4. A photographic silver halide developing-out emulsion sensitized with a supersensitizing combination of at least one pentamethine oxonol dye selected from the group represented by the following general formula:

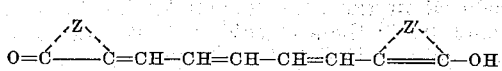

wherein Z and Z' each represents the non-metallic atoms necessary to complete a heterocyclic nucleus containing from 5 to 6 atoms in the heterocyclic ring and containing a member selected from the group consisting of sulfo groups, carboxyl groups and the ammonium and alkali metal salt forms of said groups, in a concentration of not more than 0.25 gram per mole of silver halide in the emulsion, and, as a supersensitizer for the pentamethine oxonol dye, at least one basic dye selected from the group consisting of monomethine cyanine, trimethine cyanine, dimethine hemicyanine dyes and styryl dyes.

5. A photographic gelatino-silver-halide developing-out emulsion sensitized with a supersensitizing combination of at least one pentamethine oxonol dye selected from the group represented by the following general formula:

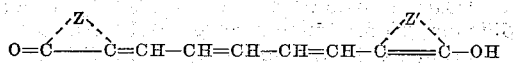

wherein Z and Z' each represents the non-metallic atoms necessary to complete a heterocyclic nucleus containing from 5 to 6 atoms in the heterocyclic ring and containing a member selected from the group consisting of sulfo groups, carboxyl groups and the ammonium and alkali metal forms of said groups, in a concentration of not more than 0.25 gram per mole of silver halide in the emulsion, and, as a supersensitizer for the pentamethine oxonol dye, at least one basic dye selected from the group consisting of monomethine cyanine dyes, trimethine cyanine dyes, dimethine hemicyanine dyes and styryl dyes.

6. A photograph silver halide developing-out emulsion sensitized with a supersensitizing combination of at least one pyrazolone pentamethine barely detectable red sensitization in a fast negative type of gelatino-silver-bromiodide emulsion. Moderately good red sensitization with maximum at about 680 mu was produced by the aforesaid oxonol dye, in a concentration of 0.043 g. per mole of silver halide, in the aforesaid emulsion in the presence of the following basic dyes:

| Basic Dye | Concentration |
|---|---|
| 3-methyl-1'-ethylthiacyanine iodide | 0.043 |
| 3,3'-diethyloxacarbocyanine iodide | 0.085 |
| 3,3'-diethylenethiacyanine iodide | 0.085 |
| 2-[β-(1-piperidyl)vinyl]-benzothiazole methochloride | 0.21 |

None of the above basic dyes are capable of producing red sensitization, in and of themselves.

Upon development, with or without exposure to white light, for 4 minutes in Eastman Kodak Company's "D–19" developer, the red sensitivity produced according to any of the foregoing embodiments disappeared practically completely, the developed emulsion being no more sensitive to red light than was the original emulsion which did not contain the oxonol dye or the basic dyes.

*Example 2*

Bis[1-phenyl-3-methyl-5-pyrazolone-(4)]-pentamethine oxonol, in concentration of 0.087 g. per mole of silver halide, caused very weak red sensitization in a fast negative type of gelatino-silver-halide emulsion with a maximum at about 670 mu. Much stronger red sensitization was produced in the same region by the aforesaid oxonol dye in the aforesaid concentration in the aforesaid emulsion, in the presence of the following basic dyes:

| Basic Dye | Concentration, g. per mole of silver halide | Red Speed Increase |
|---|---|---|
| N,N'-ethylenethiacyanine iodide (3,3'-ethylenethiacyanine iodide) | 0.087 | 25 fold. |
| 2-[β-(1-piperidyl)vinyl]-β-naphthothiazole ethiodide | 0.087 | 10 fold. |
| 1-(1-benzothiazolyl)-4-[3-ethyl-1(2)-(benzoxazolylidene)ethylidene]-3-methyl-5-pyrazolone | 0.087 | 10 fold. |

None of the above basic dyes is capable of producing red sensitivity in and of itself.

*Example 3*

Bis[1,3-diethylbarbituric acid-(5)]-pentamethine oxonol, in a concentration of 0.085 g. per mole of silver halide, caused very weak red sensitization in a process gelatino-silver-bromiodide emulsion. Much stronger red sensitization was produced in the same region by the aforesaid oxonol dye in the aforesaid concentration in the same emulsion, in the presence of 3,3'-ethylenethiacyanine iodide (0.085 g. per mole of silver halide).

Similarly bis[3-carboxy-5-pyrazolone-(4)-pentamethine]-oxonol and bis[3-methyl-5-pyrazolone-(4)]-pentamethine oxonol, neither of which gives any measurable red sensitivity in gelatino-silver-halide emulsions alone, each gave some red sensitivity, in the presence of N,N'-ethylenecyanine iodide or chloride.

In a manner similar to that illustrated in the foregoing examples photographic silver halide emulsion can be sensitized with other supersensitizing combinations of pentamethine oxonol dyes and basic dyes.

The accompanying drawing illustrates graphically the supersensitizing effect obtained with two of our new combinations in a gelatino-silver-bromoiodide emulsion. Each figure in the drawing is a diagrammatic reproduction of three spectrograms. In Fig. 1, curve A represents the sensitivity of a gelatino-silver-bromoiodide emulsion containing bis[1-phenyl-3-methyl-5-pyrazolone-(4)]-pentamethine oxonol in a concentration of 0.087 g. per mole of silver halide in the emulsion. The same curve also represents the sensitivity of the same emulsion containing 3,3'-ethylenethiacyanine iodide in a concentration of 0.087 g. per mole of silver halide in the emulsion. Actually the curve represents the spectral sensitivity of the emulsion without either of the above compounds, since at the concentrations indicated, neither compound, alone, confers any appreciable extra spectral sensitivity on the emulsion. Curve B represents the sensitivity of the same emulsion containing both of the aforesaid dyes in the concentrations set forth above. The emulsion now possesses substantial red sensitivity along with its inherent blue sensitivity, whereas before, it possessed no appreciable red sensitivity.

In Fig. 2, curve C represents the sensitivity of a gelatino-silver-bromiodide emulsion containing bis[1-phenyl-3-methyl-5-pyrazolone-(4)]-pentamethine oxonol in a concentration of 0.87 g. per mole of silver halide in the emulsion. The same curve also represents the sensitivity of the same emulsion containing 2-[β-(1-piperidyl)vinyl]-β-naphthothiazole ethiodide in a concentration of 0.87 g. per mole of silver halide in the emulsion. Actually the curve represents the spectral sensitivity of the emulsion without either of the aforesaid dyes, since at the concentrations indicated, neither dye, alone, confers any appreciable extra sensitivity on the emulsion. Curve D represents the sensitivity of the same emulsion containing both of the aforesaid dyes in the concentrations set forth above. The emulsion now possesses substantial red sensitivity along with its inherent blue sensitivity, whereas before, it possessed no appreciable red sensitivity.

The pentamethine oxonol dyes can be incorporated in the emulsions directly or in the form of a solution in a suitable solvent, e. g. methyl alcohol, ethyl alcohol or acetone. The oxonol dyes including those containing a carboxyl and/or sulfo group, can also be employed in the form of their metal or ammonium salts. The salts are advantageously formed by adding to the oxonol dye, wet with a little water, methanol or ethanol, an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc., and taking up the salt which forms in a suitable solvent, e. g. water, methanol, ethanol, a mixture of water and methanol or a mixture of water and ethanol.

The basic dyes can be added to the emulsions directly or in the form of a solution in a suitable solvent, e. g. methanol, or ethanol.

The pentamethine oxonol dyes and the basic dyes are advantageously added to the washed, finished emulsions and should be uniformly distributed throughout the emulsions.

Our invention is directed primarily to the customarily employed gelatino-silver-halide developing-out emulsions, such as gelatino-silver-chloride, gelatino-silver-chlorobromide, gelatino-silver-iodochloride, gelatino-silver-chlorobromiodide, gelatino-silver-bromide and gelatino-silver-bromiodide emulsions.

Cyanine dyes, hemicyanine dyes and styryl dyes are defined in The Theory of the Photographic Process, C. E. Kenneth Mees, The MacMillan Company, New York, 1942.

Emulsions prepared in accordance with our invention can be coated in the usual manner on any suitable support, such as glass, cellulose acetate film, cellulose nitrate film, polyvinyl acetal resin film, paper or a suitable metal support.

3,3'-ethylenethiacyanine salts and 3,3'-ethylene-oxacyanine salts are described in the copending application of Leslie G. S. Brooker and Robert H. Sprague, Serial No. 563,086, filed November 11, 1944, as are other N,N'-ethylenecyanine salts.

Pentamethine oxonol dyes can be prepared by condensing glutaconic aldehyde dianilide hydrochloride with one or more ketomethylene compounds selected from those represented by the following general formula:

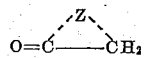

wherein Z represents the non-metallic atoms necessary to complete a heterocyclic nucleus containing from 5 to 6 atoms in the heterocyclic ring, e. g. 3-methyl-1-phenyl-5-pyrazolone, 3-methyl-1-sulfophenyl-5-pyrazolone, thiobarbituric acid, barbituric acid, etc. Two moles of the ketomethylene compound per mole of the glutaconic aldehyde dianilide hydrochloride are advantageously employed. The condensations are advantageously effected either in pyridine or in an ethyl alcoholic solution of a strong base such as triethylamine. The condensations can be accelerated by heating on a water or steam bath.

What we claim as our invention and desire to be secured by Letters Patent of the United States is:

1. A photographic silver halide emulsion sensitized with a supersensitizing combination of at least one oxonol dye selected from the group consisting of those represented by the following general formula:

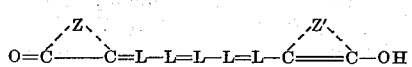

wherein L represents a methine group and Z and Z' each represents the non-metallic atoms necessary to complete a heterocyclic nucleus containing from 5 to 6 atoms in the heterocyclic ring, and the metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

2. A photographic silver halide developing-out emulsion sensitized with a supersensitizing combination of at least one oxonol dye selected from the group consisting of those represented by the following general formula:

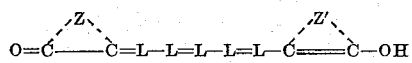

wherein L represents a methine group and Z and Z' each represents the non-metallic atoms necessary to complete a heterocyclic nucleus containing from 5 to 6 atoms in the heterocyclic ring, and the alkali metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

3. A photographic gelatino-silver-halide developing-out emulsion sensitized with a supersensitizing combination of at least one oxonol dye selected from the group represented by the following general formula:

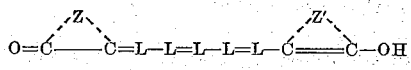

wherein L represents a methine group and Z and Z' each represents the non-metallic atoms necessary to complete a heterocyclic nucleus containing from 5 to 6 atoms in the heterocyclic ring and the metal and ammonium salt forms of the formulated dyes, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

4. A photographic silver halide developing-out emulsion sensitized with a supersensitizing combination of at least one pentamethine oxonol dye selected from the group represented by the following general formula:

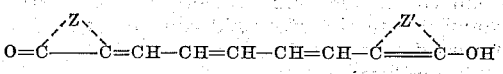

wherein Z and Z' each represents the non-metallic atoms necessary to complete a heterocyclic nucleus containing from 5 to 6 atoms in the heterocyclic ring and containing a member selected from the group consisting of sulfo groups, carboxyl groups and the ammonium and alkali metal salt forms of said groups, in a concentration of not more than 0.25 gram per mole of silver halide in the emulsion, and, as a supersensitizer for the pentamethine oxonol dye, at least one basic dye selected from the group consisting of monomethine cyanine, trimethine cyanine, dimethine hemicyanine dyes and styryl dyes.

5. A photographic gelatino-silver-halide developing-out emulsion sensitized with a supersensitizing combination of at least one pentamethine oxonol dye selected from the group represented by the following general formula:

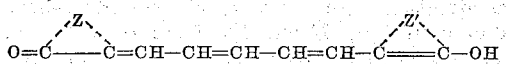

wherein Z and Z' each represents the non-metallic atoms necessary to complete a heterocyclic nucleus containing from 5 to 6 atoms in the heterocyclic ring and containing a member selected from the group consisting of sulfo groups, carboxyl groups and the ammonium and alkali metal forms of said groups, in a concentration of not more than 0.25 gram per mole of silver halide in the emulsion, and, as a supersensitizer for the pentamethine oxonol dye, at least one basic dye selected from the group consisting of monomethine cyanine dyes, trimethine cyanine dyes, dimethine hemicyanine dyes and styryl dyes.

6. A photograph silver halide developing-out emulsion sensitized with a supersensitizing combination of at least one pyrazolone pentamethine oxonol dye selected from the group represented by the following general formula:

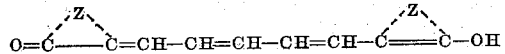

wherein Z represents the non-metallic atoms necessary to complete a 5-pyrazolone nucleus containing a member selected from the group consisting of sulfo groups, carboxyl groups and the ammonium and alkali metal salt forms of said groups, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

7. A photographic gelatino-silver-halide developing-out emulsion sensitized with a supersensitizing combination of at least one pyrazolone pentamethine oxonol dye selected from the group represented by the following general formula:

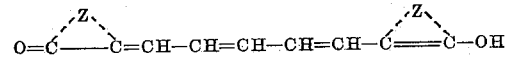

wherein Z represents the non-metallic atoms necessary to complete a 5-pyrazolone nucleus containing a member selected from the group consisting of sulfo groups, carboxyl groups and the ammonium and alkali metal salt forms of said groups, in a concentration of not more than 0.25 gram per mole of silver halide in the emulsion, and, as a supersensitizer for the oxonol dye, at least one basic dye selected from the group consisting of monomethine cyanine dyes, trimethine cyanine dyes, dimethine hemicyanine dyes and styryl dyes.

8. A photographic gelatino-silver-halide developing-out emulsion sensitized with a supersensitizing combination of at least one pentamethine oxonol dye selected from the group represented by the following general formula:

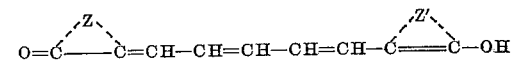

wherein Z and Z' each represents the non-metallic atoms necessary to complete a heterocyclic nucleus containing from 5 to 6 atoms in the heterocyclic ring, in a concentration of not more than 0.25 gram per mole of silver halide in the emulsion, and, as a supersensitizer for the oxonol dye, at least one monomethine cyanine dye which in and of itself confers no appreciable red sensitivity on the emulsion.

9. A photographic gelatino-silver-halide developing-out emulsion sensitized with a supersensitizing combination of at least one pyrazolone pentamethine oxonol dye selected from the group represented by the following general formula:

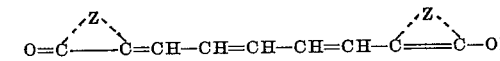

wherein Z represents the non-metallic atoms necessary to complete a 5-pryazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one monomethine cyanine dye which in and of itself confers no appreciable red sensitivity on the emulsion.

10. A photographic gelantino-silver-halide developing-out emulsion sensitized with a supersensitizing combination of at least one pyrazolone pentamethine oxonol dye selected from the group represented by the following general formula:

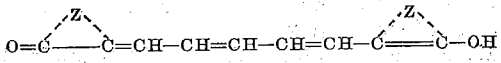

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one monomethine N,N'-ethylenecyanine dye.

11. A photographic gelatino-silver-halide developing-out emulsion sensitized with a supersensitizing combination of at least one pyrazolone pentamethine oxonol dye selected from the group represented by the following general formula:

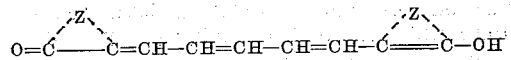

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one monomethine 3,3'-ethylenethiacyanine dye.

12. A photographic gelatino-silver-halide developing-out emulsion sensitized with a supersensitizing combination of at least one pyrazolone pentamethine oxonol dye selected from the group represented by the following general formula:

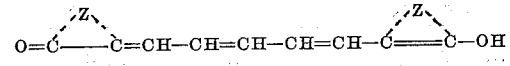

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one monomethine 3,3'-ethylenethiacyanine halide.

13. A photographic gelatino-silver-halide developing-out emulsion sensitized with a supersensitizing combination of bis[1-p-sulfophenyl-3-methyl-5-pyrazolone-(4)]-pentamethine oxonol, in a concentration of from about 0.043 to about 0.21 g. per mole of silver halide in the emulsion, and, as a supersensitizer for the oxonol dye, 3,3'-ethylenethiacyanine iodide.

14. A photographic gelatino-silver-halide developing-out emulsion sensitized with a supersensitizing combination of at least one pyrazolone pentamethine oxonol dye selected from the group represented by the following formula:

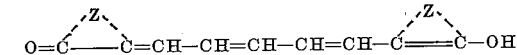

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and as a supersensitizer for the oxonol dye, at least one monomethine 3,1'-dialkylthia-2'-cyanine salt, in which the alkyl groups are of the formula $C_dH_{2d+1}$ wherein $d$ represents a positive integer of from 1 to 2.

15. A photographic gelatino-silver-halide developing-out emulsion sensitized with a supersensitizing combination of at least one pyrazolone pentamethine oxonol dye selected from the group represented by the following formula:

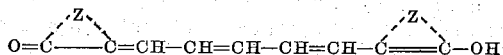

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer, for the oxonol dye, at least one monomethine 3,1'-dialkylthia-2'-cyanine halide, in which the alkyl groups are alkyl groups of the formula $C_dH_{2d+1}$ wherein $d$ represents a positive integer of from 1 to 2.

16. A photographic gelatino-silver-halide developing-out emulsion sensitized with a supersensitizing combination of bis[1-p-sulfophenyl-3-methyl-5-pyrazolone-(4)]-pentamethine oxonol, in a concentration of from 0.043 to about 0.21 gram per mole of silver halide in the emulsion, and, as a supersensitizer for the oxonol dye, 3-methyl-1'-ethylthia-2'-cyanine iodide.

17. A photographic gelatino-silver-halide developing-out emulsion sensitized with a supersensitizing combination of at least one pyrazolone pentamethine oxonol dye of the following formula:

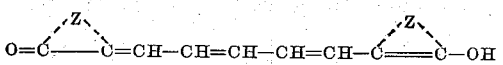

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one 2-[β-(1-piperidyl)vinyl]-benzothiazole alkyl salt in which the alkyl group is an alkyl group of the formula $C_dH_{2d+1}$ wherein $d$ represents a positive integer of from 1 to 2.

18. A photographic gelatino-silver-halide developing-out emulsion sensitized with a supersensitizing combination of at least one pyrazolone pentamethine oxonol dye of the following formula:

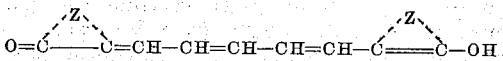

wherein Z represents the non-metallic atoms necessary to complete a pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, at least one 2-[β-(1-piperidyl)vinyl]-benzothiazole alkyl halide in which the alkyl group is an alkyl group of the formula $C_dH_{2d+1}$ wherein $d$ represents a positive integer of from 1 to 2.

19. A photographic gelatino-silver-halide developing-out emulsion sensitized with a supersensitizing combination of at least one pyrazolone pentamethine oxonol dye of the following formula:

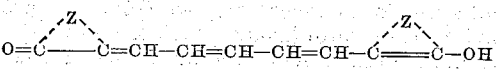

wherein Z represents the non-metallic atoms necessary to complete a 5-pyrazolone nucleus containing a member selected from the group consisting of carboxyl and sulfo groups and the ammonium and alkali metal salt forms of these groups, in a concentration of not more than 0.25 gram per mole of silver halide in the emulsion, and, as a supersensitizer for the oxonol dye, 2-[β-(1-piperidyl)vinyl]-benzothiazole methochloride.

BURT H. CARROLL.
CYRIL J. STAUD.

REFERENCES CITED

The following references are of record in the file of this patent:

UNITED STATES PATENTS

| Number | Name | Date |
|---|---|---|
| 2,158,882 | Mees | May 16, 1939 |

Disclaimer 2,448,858.—*Burt H. Carroll* and *Cyril J. Staud*, Rochester, N. Y. OPTICALLY SUPER-
SENSITIZED PHOTOGRAPHIC SILVER HALIDE EMULSION. Patent dated Sept.
7, 1948. Disclaimer filed June 7, 1950, by the assignee, *Eastman Kodak
Company*.

Hereby enters this disclaimer to claims 1 to 9, inclusive, and 14, 15, and 16 of said patent without in any way modifying the scope or affecting the validity of the remaining claims.

[*Official Gazette July 11, 1950*.]